US011526909B1

(12) United States Patent
Clepper et al.

(10) Patent No.: US 11,526,909 B1
(45) Date of Patent: Dec. 13, 2022

(54) REAL-TIME TARGETING OF ADVERTISEMENTS ACROSS MULTIPLE PLATFORMS

(71) Applicant: Honda Motor Co., Ltd., Tokyo (JP)

(72) Inventors: Erin Clepper, Columbus, OH (US); Matt Komich, Lyndhurst, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/478,276

(22) Filed: Sep. 17, 2021

(51) Int. Cl.
*G06Q 30/02* (2012.01)
*G06V 20/59* (2022.01)

(52) U.S. Cl.
CPC ..... *G06Q 30/0266* (2013.01); *G06Q 30/0254* (2013.01); *G06Q 30/0264* (2013.01); *G06V 20/597* (2022.01)

(58) Field of Classification Search
CPC .................................................. G06Q 30/0264
USPC ...................................................... 705/14.62
See application file for complete search history.

(56) References Cited

U.S. PATENT DOCUMENTS

| | | | |
|---|---|---|---|
| 8,667,402 B2 | 3/2014 | Goldman et al. | |
| 9,604,571 B1 * | 3/2017 | Kurtovic | B60N 2/002 |
| 9,648,581 B1 | 5/2017 | Vaynblat et al. | |
| 10,002,337 B2 | 6/2018 | Siddique et al. | |
| 10,135,887 B1 | 11/2018 | Esser et al. | |
| 10,255,031 B2 | 4/2019 | Dange | |
| 10,310,723 B2 | 6/2019 | Rathod | |
| 10,380,650 B2 | 8/2019 | Hamedi et al. | |
| 10,952,054 B2 | 3/2021 | Bajwa et al. | |

(Continued)

FOREIGN PATENT DOCUMENTS

| | | |
|---|---|---|
| CN | 102196314 A | 9/2011 |
| CN | 104618506 B | 9/2019 |

(Continued)

OTHER PUBLICATIONS

Hecht, Dan, What is Retargeting? How to Set Up an Ad Retargeting Campaign, dated Aug. 5, 2021, downloaded Oct. 21, 2022 from https://blog.hubspot.com/marketing/retargeting-campaigns-beginner-guide (Year: 2021).*

(Continued)

*Primary Examiner* — Scott D Gartland
(74) *Attorney, Agent, or Firm* — Aaron Fong; American Honda Motor Co., Inc.

(57) ABSTRACT

A server and a method for real-time targeting of advertisements across multiple platforms is provided. The server receives first information that indicates a presence of a first person in a first vehicle at a first time period. The server determines content metadata associated with media content rendered via an infotainment device of the first vehicle. The server transmits first advertisement content to the infotainment device. The server receives second information that indicates an absence of the first person from the first vehicle at a second time period. The server further determines a first application used by the first person on an electronic device within a time threshold from the second time period. The server further transmits second advertisement content, to be rendered on the determined first application, to the first electronic device. The second advertisement content may be associated with the first advertisement content.

20 Claims, 6 Drawing Sheets

(56) References Cited

U.S. PATENT DOCUMENTS

| | | | |
|---|---|---|---|
| 2003/0154805 A1* | 8/2003 | Takafuji | B60R 21/01516 |
| | | | 73/862.391 |
| 2011/0047025 A1* | 2/2011 | Demir | G06Q 30/0256 |
| | | | 705/14.54 |
| 2011/0106375 A1* | 5/2011 | Gurusamy Sundaram | |
| | | | H04W 4/00 |
| | | | 701/31.4 |
| 2012/0209694 A1 | 8/2012 | Kunchakarra et al. | |
| 2013/0091015 A1* | 4/2013 | George | G06Q 30/02 |
| | | | 705/14.58 |
| 2013/0103750 A1 | 4/2013 | Awad | |
| 2014/0218527 A1* | 8/2014 | Subramanya | G01S 13/04 |
| | | | 348/148 |
| 2017/0316463 A1 | 11/2017 | Pielot et al. | |
| 2017/0337589 A1* | 11/2017 | Yu | G06Q 30/0277 |
| 2021/0065597 A1* | 3/2021 | Pande | G09G 3/006 |
| 2021/0179014 A1* | 6/2021 | Hasegawa | B60R 25/24 |
| 2021/0209647 A1* | 7/2021 | Dornich | G06Q 30/0265 |
| 2021/0306684 A1* | 9/2021 | Gauny | G06V 20/49 |
| 2021/0357981 A1* | 11/2021 | Heller | G06Q 30/0205 |

FOREIGN PATENT DOCUMENTS

| | | |
|---|---|---|
| KR | 20120097115 A | 9/2012 |
| KR | 20150083945 A | 7/2015 |
| KR | 20150118592 A | 10/2015 |

OTHER PUBLICATIONS

Gotter, Ana, Facebook Retargeting Ads: The Best Strategies You May be Missing, dated Feb. 9, 2021, downloaded Oct. 21, 2022 from https://adespresso.com/blog/facebook-ad-retargeting-strategies-need-try/ (Year: 2021).*

Retarget, Merriam-Webster definition, downloaded from https://www.merriam-webster.com/dictionary/retarget on Oct. 21, 2022 (Year: 2022).*

* cited by examiner

US 11,526,909 B1

REAL-TIME TARGETING OF ADVERTISEMENTS ACROSS MULTIPLE PLATFORMS

BACKGROUND

With the advancement in data collection and processing, various insights about a person's traits, interests, and/or preferences may be analyzed. Based on the analyzed traits, interests, and/or preferences of a person, various advertisements for a product, a service, or a brand may be targeted to the person. These advertisements are commonly referred as targeted advertisements and may be in various formats such as an audio advertisement, a visual advertisement (like audio, video, image etc.). However, most of the times, these targeted advertisements may be presented on a single platform and at times the person may not be interested in that particular advertisement or is not in a mood to see the product, the service, or the brand advertised in the advertisements. For example, if a person normally drinks coffee from a café in the morning, and an advertisement about a new coffee store (or a new discount offer) is presented to the person in the evening, then the advertisement may be ignored by the person. This may be irrelevant to the person because the person may not be near to the café (or near to the new coffee store) in the evening or he/she may not prefer to drink the coffee in the evening. Therefore, targeting of a relevant advertisement to interested customers on a real-time basis may be important to the success of an advertisement campaign.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a server for real-time targeting of advertisements across multiple platforms is provided. The service may include circuitry. The circuitry may be configured to receive first information from a first infotainment device of a first vehicle or from a first electronic device of a first person. The first information may indicate a presence of the first person in the first vehicle at a first time period. The circuitry may further determine content metadata associated with media content rendered via the first infotainment device of the first vehicle based on the received first information. The circuitry may be further configured to transmit first advertisement content to the first infotainment device of the first vehicle based on the determined content metadata. The circuitry may be further configured to receive second information from the first infotainment device of the first vehicle or from the first electronic device of the first person. The second information may indicate an absence of the first person from the first vehicle at a second time period. The circuitry may be further configured to determine a first application used by the first person on the first electronic device within a time threshold from the second time period. The circuitry may be further configured to transmit second advertisement content, to the first electronic device, to be rendered on the determined first application. The second advertisement may be associated with the first advertisement content.

According to another embodiment of the disclosure, a method for real-time targeting of advertisements across multiple platforms is provided is provided. The method may include receiving first information from a first infotainment device of a first vehicle or from a first electronic device of a first person. The first information may indicate a presence of the first person in the first vehicle at a first time period. The method may include determining content metadata associated with media content rendered via the first infotainment device of the first vehicle based on the received first information. The method may further include transmitting first advertisement content to the first infotainment device of the first vehicle based on the determined content metadata. The method may further include receiving second information from the first infotainment device of the first vehicle or from the first electronic device of the first person. The second information may indicate an absence of the first person from the first vehicle at a second time period. The method may further include determining a first application used by the first person on the first electronic device within a time threshold from the second time period. The method may further include transmitting second advertisement content, to the first electronic device, to be rendered on the determined first application. The second advertisement may be associated with the first advertisement content.

According to another embodiment of the disclosure, a non-transitory computer-readable medium is provided. The non-transitory computer-readable medium may have stored thereon computer implemented instructions that, when executed by a server, causes the server to execute operations. The operations may include receiving first information from a first infotainment device of a first vehicle or from a first electronic device of a first person. The first information may indicate a presence of the first person in the first vehicle at a first time period. The operations may further include determining content metadata associated with media content rendered via the first infotainment device of the first vehicle based on the received first information. The operations may further include transmitting first advertisement content to the first infotainment device of the first vehicle based on the determined content metadata. The operations may further include receiving second information from the first infotainment device of the first vehicle or from the first electronic device of the first person. The second information may indicate an absence of the first person from the first vehicle at a second time period. The operations may further include determining a first application used by the first person on the first electronic device within a time threshold from the second time period. The operations may further include transmitting second advertisement content, to the first electronic device, to be rendered on the determined first application. The second advertisement may be associated with the first advertisement content.

Figure 1:
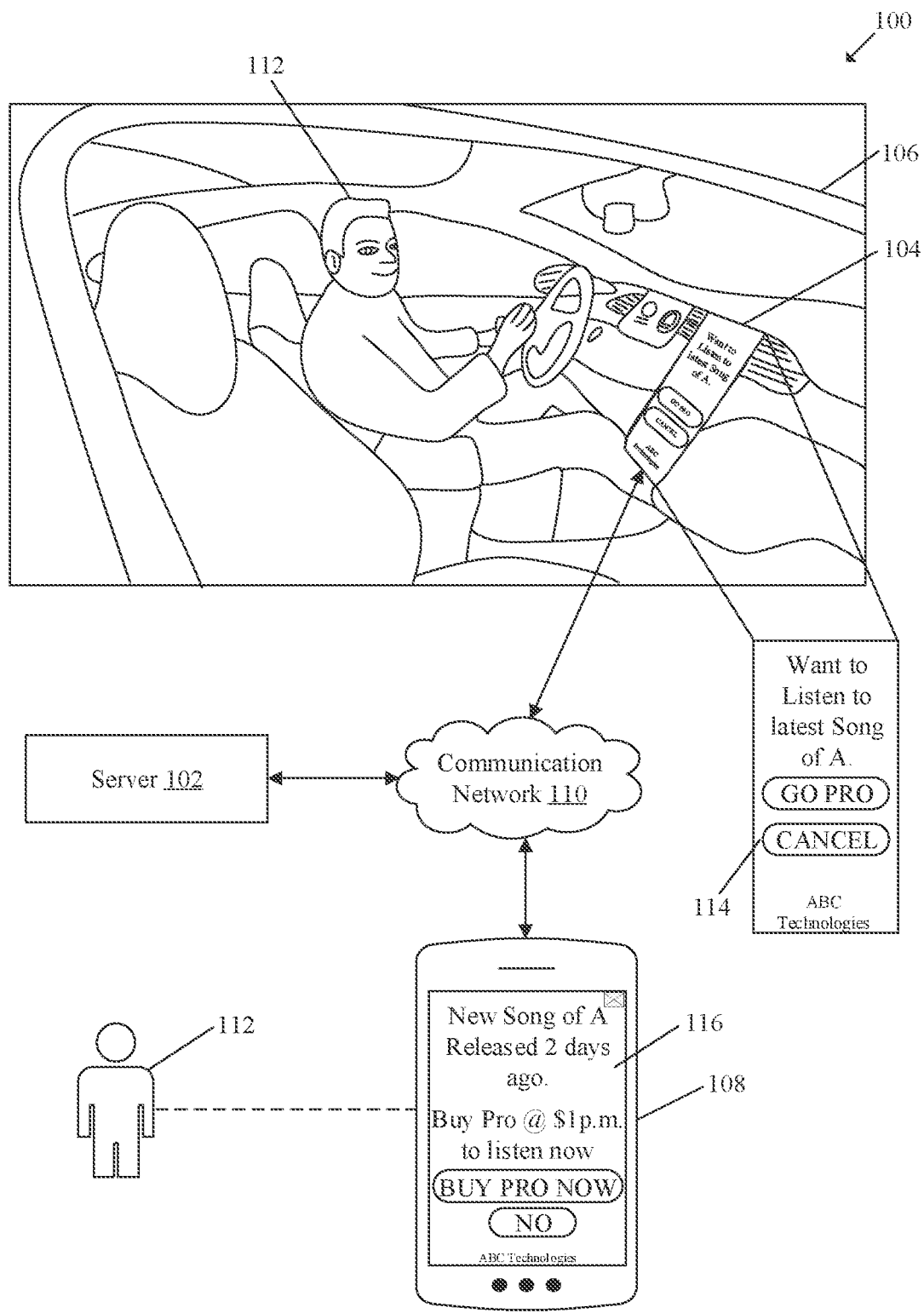
FIG. 1 is a block diagram that illustrates an exemplary network environment for real-time targeting of advertisements across multiple platforms, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed server for real-time targeting of advertisements across multiple platforms. Exemplary aspects of the disclosure may provide a server (such as an advertisement server) that may be configured to receive first information from an infotainment device of a vehicle (such as, but not limited to, a car or a truck) or from an electronic device (such as a mobile phone) of a person (such as a driver or a passenger) of the vehicle. The first information may indicate a presence of the person in the vehicle at a first time period. The server may be further configured to determine content metadata (such as, but not limited to, a genre, label, artist, composer, title, album name, or track duration) associated with media content (such as, a song or a video) that may be rendered via the infotainment device of the vehicle based on the received first information. The server may be further configured to transmit first advertisement content to the infotainment device of the vehicle based on the determined content metadata. The server may be further configured to receive second information from the infotainment device of the vehicle or from the electronic device of the person. The second information may indicate an absence of the person from the vehicle at a second time period after the first time period. The absence of the person at the second time period may correspond to an exit of the person from the vehicle. The server may be further configured to determine an application used by the person on the electronic device within a time threshold (for example few minutes or seconds) from the second time period. The determined application may be most frequently accessed application by the person after driving or after the exit from the vehicle or within the time threshold from the second time period. The server may be further configured to transmit, to the electronic device, second advertisement content to be rendered on the determined application. The second advertisement content may be associated with the first advertisement content.

Various studies have indicated that people may be more focused towards content they hear or watch while driving or travelling in a vehicle. Moreover, various studies have also indicated that people may retain such content that they listen or view while driving or travelling in the vehicle as compared to content that they listen or view otherwise. Thus, such studies may indicate that a listening/viewing experience of the person inside the vehicle may be better than in any other environment. Therefore, a first advertisement content rendered via an audio/video interface of the infotainment device of the vehicle may be retained by the person travelling in the vehicle for a longer period of time. The rendered first advertisement content may be based on, but is not limited to, an emotional state (or mood) of the person, a geo-location of the person (or vehicle), demographic information associated with the person, and/or interests (and/or preferences) of the person. In an embodiment, the disclosed server may be capable to transmit real-time advertisements, to be rendered in the vehicle, based on (but is not limited to) the emotional state (or mood) of the person, the geo-location of the person (or vehicle), the demographic information associated with the person, and/or the interests (and/or the preferences) of the person.

The disclosed server may be further configured to target second advertisement content (i.e. similar to the first advertisement content) on one or more mobile applications installed on a mobile device of the person. In case, the one or more mobile applications are frequently used applications used by the person (for example after driving), the re-targeting of advertisements may be yield good results (e.g., higher click-through ratios). For example, the second advertisement content may be re-targeted on the mobile device of the person (for example with a time period after driving) to remind the person about the first advertisement content or refresh the memory of the person about the first advertisement content rendered during the driving. Thus, the disclosed server may be capable to serve real-time follow-up advertisements, across multiple platforms (i.e. vehicle's infotainment device and mobile phone application), to the person so that a probability to access a product/service related to the rendered advertisement may increase, which may in-turn increase a brand recognition related to the advertisement.

In further embodiment, the disclosed server may be configured to receive information about sharing of the media content (such as a song or video) from the first person to a second person (for example a friend, family member or a colleague). Based on the reception of such information, the disclosed server may transmit the first advertisement, rendered on the infotainment device of the first vehicle, to a second infotainment device of a second vehicle of the second person (or to a second electronic device of the second person). It may be assumed that the second person who may be interested in the media content shared by the first person, may also be a potential target for the first advertisement content. Thus, the disclosed server may further render the second advertisement content (i.e. rendered on the mobile device associated with the first person) on the second electronic device associated with the second person. Therefore, the disclosed server may be capable to provide the same or related advertisement to multiple persons (or parties) based on the sharing of the media content.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for real-time targeting of advertisements across multiple platforms, in accordance with an embodiment of the disclosure. With reference to FIG. 1, there is shown a network environment diagram 100 which may include a server 102. In FIG. 1, there is shown a first infotainment device 104 of a first vehicle 106. There is further shown a first electronic device 108 and a communication network 110. The first electronic device 108 may be associated with a first person 112 who may be travelling in the first vehicle 106 (either as a driver or a passenger). Further, in FIG. 1, there is also shown first advertisement content 114 and a second advertisement content 116 as examples.

The server 102 may include suitable logic, circuitry, interfaces, and/or code that may be configured to transmit advertisement contents to the first infotainment device 104 of the first vehicle 106 or to the first electronic device 108 of the first person 112 based on different factors, such as (but not limited to), geo-location of the first vehicle 106, demographics of the first vehicle 106, media content provided to the first infotainment device 104 (or to the first electronic device 108), or sharing information related to the media content. Example implementations of the server 102 may include, but are not limited to, an advertisement server, a content server, a database server, a file server, a web server, a media server, an application server, a mainframe server, or a cloud computing server. The server 102 may be implemented as a cloud server and may execute operations through web applications, cloud applications, HTTP requests, repository operations, file transfer, and the like. In at least one embodiment, the server 102 may be implemented as a plurality of distributed cloud-based resources by use of several technologies that are well known to those ordinarily skilled in the art. In another embodiment, the server 102 may correspond to a computing device, a mainframe machine, a computer workstation, and/or any device with data processing and transmission capabilities.

The first infotainment device 104 may include suitable logic, circuitry, and/or interfaces that may be configured to render at least an audio-based data, a video-based data and a user interface of the first vehicle 106. The first infotainment device 104 may execute one or more of the plurality of operations such as, but not limited to, transmission of the first information and the second information to the server 102, reception of the media content and the first advertisement content 114 from the server 102, and rendering of the media content and the first advertisement content 114. In an embodiment, the first infotainment device 104 may include an audio interface, and a display interface. The first infotainment device 104 may render the media content or the first advertisement content 114 via at least one of the display interface or the audio interface of the first infotainment device 104 of the first vehicle 106. Examples of the first infotainment device 104 may include, but are not limited, an in-vehicle infotainment (IVI) system, an entertainment system, an automotive Head-up Display (HUD), an automotive dashboard, a human-machine interface (HMI), a navigation system, a vehicle user interface (UI) system, a vehicle music system, an Advanced Driver-Assistance System (ADAS), an Internet-enabled communication system, and other entertainment systems.

The first vehicle 106 may be a non-autonomous vehicle, a semi-autonomous vehicle, or a fully autonomous vehicle, for example, as defined by National Highway Traffic Safety Administration (NHTSA). Examples of the first vehicle 106 may include, but are not limited to, a four-wheeler vehicle, a three-wheeler vehicle, a two-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The first vehicle 106 may be a system through which the first person 112 may travel from a start point to a destination point. Examples of the four-wheeler vehicle may include, but are not limited to, an electric car, an internal combustion engine (ICE)-based car, a fuel-cell based car, a solar powered-car, or a hybrid car. Similarly, examples of the two-wheeler vehicle may include, but are not limited to, an electric two-wheeler, an internal combustion engine (ICE)-based two-wheeler, or a hybrid two-wheeler. It may be noted that the four-wheeler first vehicle 106 is merely shown as an example in FIG. 1. The present disclosure may be also applicable to other types of two-wheelers (e.g., a scooter) or four-wheelers. The description of other types of the vehicles has been omitted from the disclosure for the sake of brevity.

The first electronic device 108 may include suitable logic, circuitry, and interfaces that may be configured to transmit the first information to the server 102. The first electronic device 108 may be configured to render the received second advertisement content 116 on one or more applications (such as the determined first application). In an embodiment, the first electronic device 108 may be owned or used by the first person 112. Examples of first electronic device 108 may include, but are not limited to, a computing device, a smartphone, a cellular phone, a mobile phone, a gaming device, a mainframe machine, a laptop, a computer workstation, and/or a consumer electronic (CE) device.

The communication network 110 may include a communication medium through which the server 102, the first infotainment device 104 of the first vehicle 106, and the first electronic device 108 may communicate with each other. The communication network 110 may be one of a wired connection or a wireless connection. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in FIG. 1 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 may receive first information that may indicate a presence of the first person 112 in the first vehicle 106 at a first time period (in HH.MM.SS format). The first person 112 may be driving the first vehicle 106 or travelling in the first vehicle 106 at the first time period. The first information may be received from the first infotainment device 104 of the first vehicle 106 or from the first electronic device 108 of the first person 112. Based on the reception of the first information, the server 102 may be further configured to determine content metadata associated with media content that may be rendered via the first infotainment device 104 of the first vehicle 106. In an embodiment, the server 102 may receive media information from the first infotainment device 104. The media information may include information about the media content (for example a song or a video) being rendered via the audio interface and/or via the display/interface of the first infotainment device 104 of the first vehicle 106. Based on the reception of the media information and the first information, the server 102 may determine the content metadata (for example genre) associated with the media content. Details of the content metadata are provided, for example, in FIG. 3.

The server 102 may be further configured to transmit the first advertisement content 114 to the first infotainment device 104 of the first vehicle 106 based on the determined content metadata. The first infotainment device 104 may be configured to receive the first advertisement content 114 and further render the received first advertisement content 114 via the audio interface and/or via the display interface of the first infotainment device 104 of the first vehicle 106. The first advertisement content 114 may include advertisement information of one or more of, but not limited to, a first product, a first brand, or a first service, that may be related to the media content.

At a second time period after the first time period, the server 102 may be configured to receive second information from the first infotainment device 104 of the first vehicle 106 or from the first electronic device 108 of the first person 112. The received second information may be indicative of an absence (or exit) of the first person 112 from the first vehicle 106 at the second time period. The server 102 may be further configured to determine a first application used by the first person 112 on the first electronic device 108 within a time threshold from the second time period. The first application may be a most used application, by the first person 112, after travelling in the first vehicle 106 or driving the first vehicle 106.

The server 102 may be further configured to transmit second advertisement content to the first electronic device 108 associated with the first person 112. The second advertisement content 116 may be rendered on the determined first application. The second advertisement content 116 may be associated with the first advertisement content 114 rendered on the first infotainment device 104 (i.e. while the first person 112 may be travelling in the first person 112). In some embodiments, the second advertisement content 116 may be same as the first advertisement content 114. As the first advertisement content 114 advertises about one or more of: the first product, the first brand, or the first service, the second advertisement content 116 may also advertise about one or more of: the first product, the first brand, or the first service to the first person 112 both during driving and after driving, on different platforms (i.e. on the first infotainment device 104 during driving and on the first application on the first electronic device 108 after driving). In some embodiments, the second advertisement content 116 may be different to the first advertisement content 114. In such embodiment, the second advertisement content 116 may advertise about one or more of: a second product (similar to the first product), a second brand (similar to the first brand), or a second service (similar to the first service). It may be noted that the first advertisement content 114 and the second advertisement content 116 shown in FIG. 1 is presented merely an example. There may be different types or formats of advertisement rendered on the first infotainment device 104 and the first electronic device 108, without a deviation from the scope of the disclosure.

Figure 2:
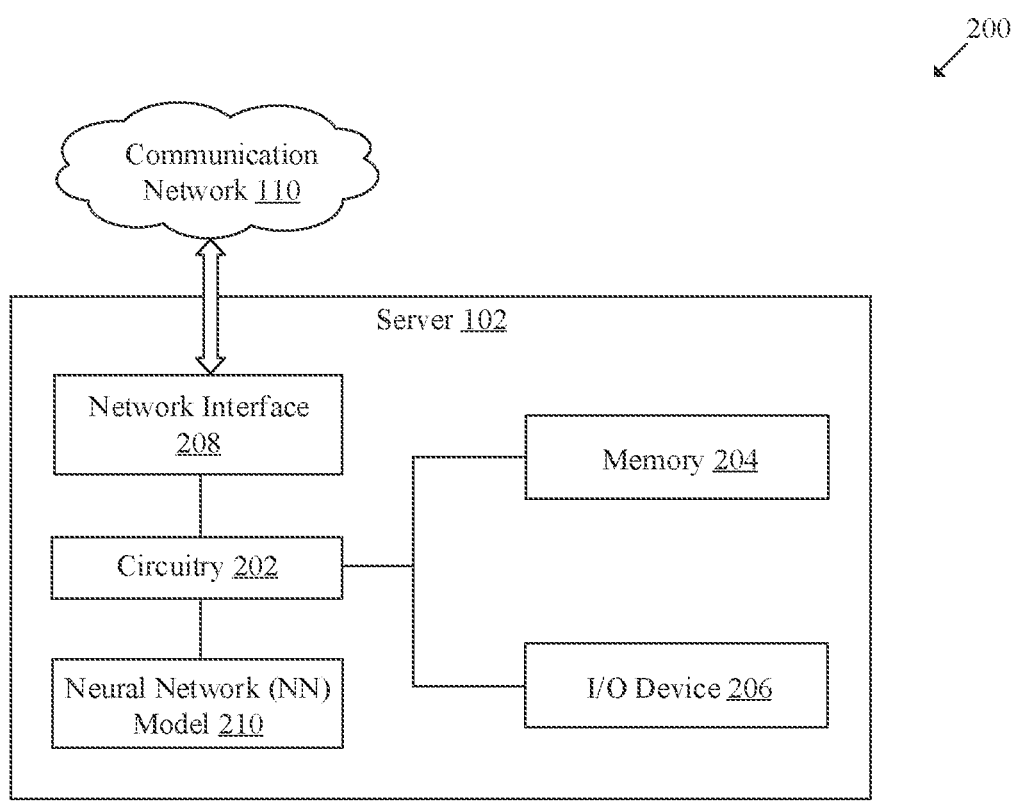
FIG. 2 is a block diagram that illustrates an exemplary server for real-time targeting of advertisements across multiple platforms, in accordance with an embodiment of the disclosure.

FIG. 2 is a block diagram that illustrates an exemplary server for real-time targeting of advertisements across multiple platforms, in accordance with an embodiment of the disclosure. FIG. 2 is explained in conjunction with elements from FIG. 1. With reference to FIG. 2, there is shown a block diagram 200 of the server 102. The server 102 may include circuitry 202, a memory 204, an input/output (I/O) device 206, a network interface 208, and a neural network (NN) model 210. The circuitry 202 may be connected to the memory 204, the I/O device 206, the network interface 208, and the neural network (NN) model 210 through wired or wireless connections. Although in FIG. 2, it is shown that the server 102 includes the circuitry 202, the memory 204, the I/O device 206, the network interface 208, and the NN model 210; however, the disclosure may not be so limiting, and the server 102 may include less or more components to perform the same or other functions of the server 102. Details of the other functions or components have been omitted from the disclosure for the sake of brevity.

The circuitry 202 may include suitable logic, circuitry, and/or interfaces code that may be configured to execute a set of operations of the server 102. The set of operations may include, but are not limited to, reception of the first information, determination of the content metadata, transmission of the first advertisement content 114, reception of the second information, determination of the first application, and transmission of the second advertisement content 116. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the server 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the received first information and the received second information. The memory 204 may be further configured to store the determined content metadata, usage statistics of applications on the first electronic device 108, capability information of the first electronic device 108, first demographic information of the first person 112, first location information of the first person 112, an emotional state of the first person 112, and sharing information. The memory 204 may be further configured to store the second demographic information, second location information and interaction data (i.e. described, for example, in FIG. 5). In an embodiment, the memory 204 may include the neural network (NN) model 210. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to may receive inputs (such as a first input) from the first infotainment device 104, and provide output (such as, the first advertisement content 114 and the second advertisement content 116). The I/O device 206 may include one or more input and output devices that may communicate with different components of the server 102. Examples of the I/O device 206 may include, but are not limited to, a touch screen, a keyboard, a mouse, a joystick, a microphone, a speaker, and a display device.

The network interface 208 may include suitable logic, circuitry, and interfaces that may be configured to facilitate communication between the circuitry 202, the first infotainment device 104, and the first electronic device 108, via the communication network 110. The network interface 208 may be implemented by use of various known technologies to support wired or wireless communication of the server 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The neural network (NN) model 210 may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the NN model 210 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the NN model 210, one or more parameters of each node of the neural network may be updated based on whether an output of the final layer for a given input (from the training dataset) matches a correct result based on a loss function for the neural network. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

The NN model 210 may include electronic data, which may be implemented as, for example, a software component of an application executable on the server 102. The NN model 210 may rely on libraries, external scripts, or other logic/instructions for execution by a processing device, such as the circuitry 202. The NN model 210 may include code and routines configured to enable a computing device, such as the circuitry 202 to perform one or more operations for determination of the emotional state of the first person 112 while the first person 112 is in the first vehicle 106 based on one or more images of the first person 112 in the first vehicle 106. Additionally or alternatively, the NN model 210 may be implemented using hardware including a processor, a microprocessor (e.g., to perform or control performance of one or more operations), a field-programmable gate array (FPGA), or an application-specific integrated circuit (ASIC). Alternatively, in some embodiments, the NN model 210 may be implemented using a combination of hardware and software.

Examples of the neural network model 210 may include, but are not limited to, a deep neural network (DNN), a convolutional neural network (CNN), an artificial neural network (ANN), a fully connected neural network, a deep Bayesian neural network, and/or a combination of such networks. (DNNs). The functions or operations executed by the server 102, as described in FIG. 1, may be performed by the circuitry 202. Operations executed by the circuitry 202 are described in detail, for example, in the FIGS. 3, 4, 5 and 6.

Figure 3:
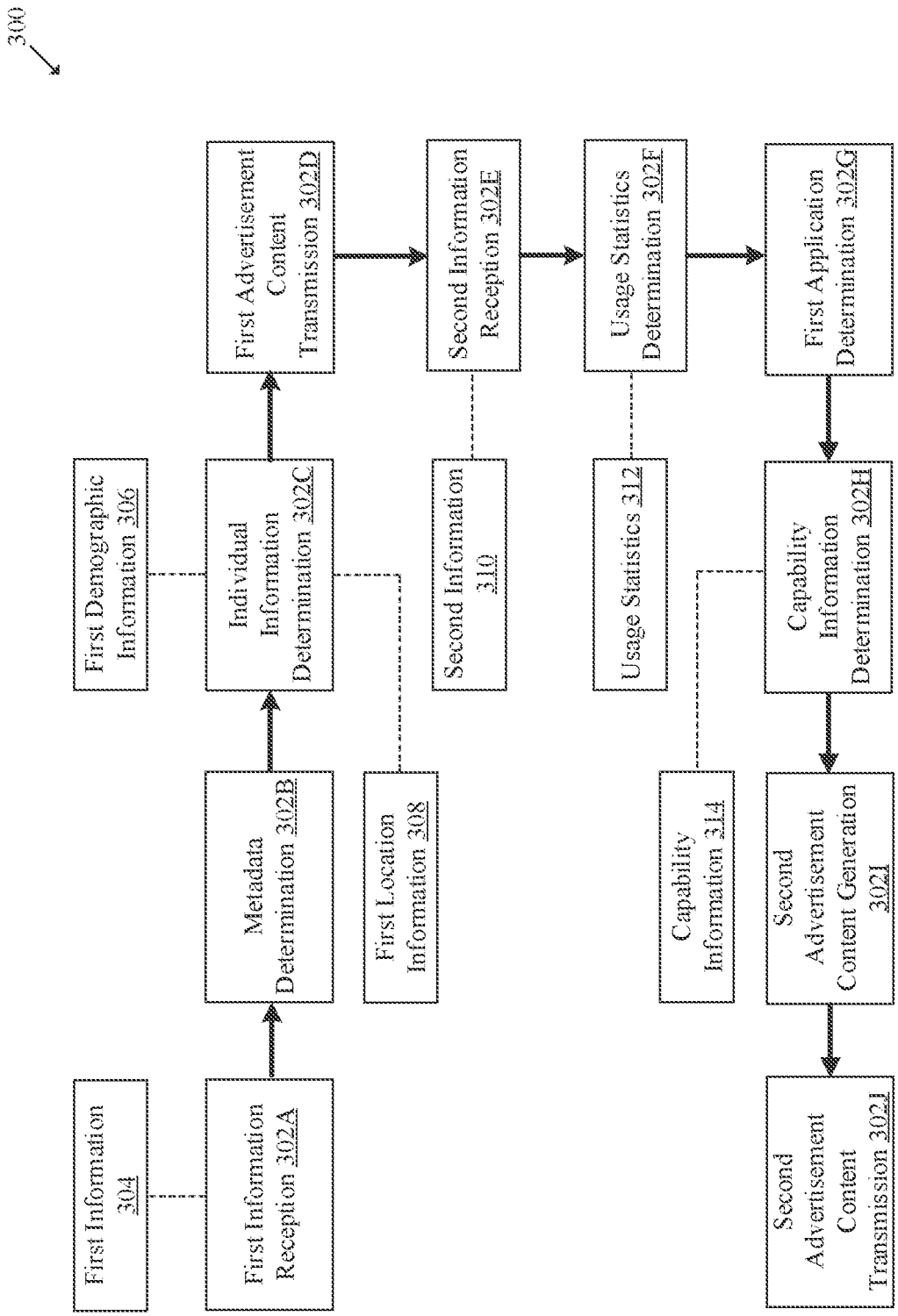
FIG. 3 is a diagram that illustrates exemplary operations for real-time targeting of advertisements across multiple platforms, in accordance with an embodiment of the disclosure.

FIG. 3 is a diagram that illustrates exemplary operations for real-time targeting of advertisements across multiple platforms, in accordance with an embodiment of the disclosure. FIG. 3 is explained in conjunction with elements from FIG. 1 and FIG. 2. With reference to FIG. 3, there is shown a block diagram 300 of exemplary operations from 302A to 302J performed by the server 102 or the circuitry 202.

At 302A, a first information reception operation may be executed. In an embodiment, for the first information reception operation, the circuitry 202 of the server 102 may be configured to receive first information 304. The first information 304 may indicate a presence of the first person 112 in the first vehicle 106 at a first time period. The first information 304 may be received from the first infotainment device 104 of the first vehicle 106 or from the first electronic device 108 of the first person 112.

In an embodiment, the first infotainment device 104 of the first vehicle 106 may transmit the first information 304 to the server 102 as soon as an engine of the first vehicle 106 is started. In another embodiment, the first electronic device 108 may be configured to transmit the first information 304 to the server 102 based on a reception of a user input to start the engine of the first vehicle 106 or to start a ride using the first vehicle 106. In such a scenario, the transmitted first information 304 may indicate that the first person 112 may be present in the first vehicle 106. The first time period may be in a time format (such as HH:MM). As an example, at the first time period, the first person 112 may start travelling in (or driving) the first vehicle 106 to reach corresponding destination. In another embodiment, the first information may be generated by an image capture device (like an internal camera not shown in FIG. 3) of the first vehicle 106, which may detect a person within the first vehicle 106 based on different object detection techniques.

At 302B, a metadata determination operation may be executed. In an embodiment, for the metadata determination operation, the circuitry 202 may be configured to determine content metadata associated with media content that may be rendered via the first infotainment device 104 of the first vehicle 106. The circuitry 202 may be configured to determine the content metadata associated with the media content, based on the reception of the first information 304. For example, the circuitry 202 may determine whether the first person 112 is present in the first vehicle 106 based on the first information. In case it is determined that the first person 112 is present in the first vehicle 106, the circuitry 202 may determine the content metadata associated with the rendered media content. The media content may correspond to audio media content (for example a song, a tone, a music file, or an audio file) or video media content (for example a video clip or a movie). The media content may be rendered via an audio interface or a video interface (e.g., through a display device and a speaker) of the first infotainment device 104 of the first vehicle 106. Specifically, the audio media content may be rendered via the audio interface of the first infotainment device 104 and the video media content may be rendered via both the audio interface and the video interface of the first infotainment device 104. In some embodiments, the media content rendered on the first infotainment device 104 may be stored at the server 102 and provided to the first infotainment device 104 from the server 102 or from another media server (not shown).

The circuitry 202 may be further configured to determine the content metadata associated with the media content. The content metadata may provide information associated with the media content. In case the media content is stored on the first infotainment device 104 or the first electronic device 108, the circuitry 202 may extract the content metadata from a pre-stored media file associated with the media content. In another scenario, in case the media content is not stored on either of the first infotainment device 104 or the first electronic device 108, the circuitry 202 may search for the content metadata associated with the media content from the memory 204, other media server or the Internet. By way of example, and not limitation, the content metadata associated with the audio media content may include information about a genre, a track duration, an artist, a producer, a writer, a singer, a song title, a creation data, a release date, and the like. As another example, the content metadata associated with the video media content may include information about, but is not limited to, a genre, a description, a title, a creation date, a modification date, a release date, a video identifier, a video version, a copyright notice, a copyright year, a creator, a director, a licensor, a producer, a rights owner, and the like.

At 302C, an individual information determination operation may be executed. In an embodiment, for the individual information determination operation, the circuitry 202 may be configured to determine an emotional state of the first person 112 in the first vehicle 106. In an embodiment, the circuitry 202 may determine the emotional state of the first person 112 based on the genre (i.e. content metadata) of the media content. The genre of the media content may correspond a specific category of the media content that may have one or more special characteristics that may be absent in other categories. The genre of the media content may be determined from the content metadata. For example, the genre of an audio media content (or a song) may be one of, but not limited to, Rock, Jazz, Pop, Classic, Hard Metal, Folk music, disco, techno, opera, and the like.

The circuitry 202 may determine the emotional state of the first person 112 based on the genre of the media content that may be rendered via the first infotainment device 104 of the first vehicle 106. The emotional state may indicate an emotion (or a mood) of the first person 112. The emotion of the first person 112 may be one of, but not limited to, happy, sad, emotional, disgust, fear, surprise, anger, excited, stressed, scared, and the like. For example, if the first person 112 is listening to the audio media content with 'Rock' genre, the circuitry 202 may determine that the first person 112 may be happy. In an embodiment, the memory 204 may store a look-up table that may include a mapping between genres of the media content and emotional states of a person. The mapping in the stored look-up table may be pre-determined based on user-inputs received from multiple people or from a survey. For example, a person may be presented with the media content of a certain genre and prompted to input information about an emotion or a mood after/while listening or viewing the media content. Based on the provided inputs, the information about the emotion or mood related to the genre or the media content may be provided to the server 102 (for example by the first infotainment device 104 or by the first electronic device 108) and may be further used to generate the mapping in the look-up table. The circuitry 202 of the server 102 may determine the emotional state the first person 112 based on the stored look-up table with respect to the genre of the media content rendered on the first infotainment device 104.

In another embodiment, one or more image capture devices (not shown) may be integrated within the first vehicle 106. Each of the one or more image capture devices may include suitable logic, circuitry, and interfaces that may be configured to capture one or more images of the first person 112 in the first vehicle 106. The circuitry 202 may be configured to control the one or more image capture devices to capture the one or more images of the first person 112 in the first vehicle 106 and transmit the captured one or more images to the server 102. Examples of image capture devices may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The circuitry 202 may receive the captured one or more images of the first person 112 in the first vehicle 106 from one or more image capture devices. The circuitry 202 may further determine the emotional state of the first person 112 based on the captured one or more images. Specifically, the circuitry 202 may apply the neural network model 210 on the captured one or more images to determine the emotional state of the first person 112. As discussed above, the NN model 210 may be trained to determine the emotional state of a person based various training images of human being. For example, the captured one or more images may be utilized to determine a facial expression of the first person 112. The facial expression may indicate one or more motions or positions of muscles of a face of the first person 112, where the facial expressions may manifest an emotion. The muscles of the face may move the skin of the first person 112, may create facial lines/folds, or may cause the movement of facial features, such as mouth, head, nose, eye, eyebrows of the first person 112. The circuitry 202 may be configured to determine the emotional state of the first person 112 based on the determined facial expression of the first person 112, by application of the neural network model 210 on the determined facial expression of the first person 112 and/or on the captured one or more images. Different type of emotions may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion.

In an embodiment, in the individual information determination operation, the circuitry 202 may be further configured to determine first demographic information 306 associated with the first person 112. The first demographic information 306 may include, but is not limited to, an age, a gender, one or more interests, one or more preferences, a family income, a race and ethnicity, a qualification, a marital status, or a nature of employment, of the first person 112. For example, the first demographic information 306 may be received from the first person 112 as a user-input provided through at least one of the first infotainment device 104 or the first electronic device 108. In some embodiments, the circuitry 202 may recognize the first person 112 based on one or more images of the first person 112 received from the first infotainment device 104 or the first electronic device 108. The circuitry 202 may further retrieve the first demographic information 306 of the recognized first person 112 from the memory 204 or from a different server or a repository (not shown). In some embodiments, the circuitry 202 may further generate a first user profile of the first person 112 based on the determined first demographic information 306 and store the generated first user profile in the memory 204 to render different advertisement content in a future time.

In an embodiment, the circuitry 202 may be further configured to determine first location information 308 associated with a first geo-location of the first vehicle 106 or the first electronic device 108 at the first time period. In an embodiment, a location sensor (not shown) may be embedded into the first vehicle 106 or into the first electronic device 108. The location sensor may include suitable logic, circuitry, and/or interfaces that may be configured to determine a current geo-location of the first vehicle 106 or the first electronic device 108 at the first time period. The location sensor may be further configured to transmit the determined current geo-location of the first vehicle 106 or the first electronic device 108 at the first time period to the server 102, via the communication network 110. In some embodiments, the first infotainment device 104 or the first electronic device 108 may transmit the determined geo-location (i.e. detected by the location sensor) to the server 102. Examples of the location sensor may include, but are not limited to, a Global Navigation Satellite System (GNSS)-based sensor. Examples of the GNSS-based sensor may include, but are not limited to, global positioning sensor (GPS), Global Navigation Satellite System (GLONASS), or other regional navigation systems or sensors. The server 102 may be configured to receive the current geo-location of the first vehicle 106 or the first electronic device 108 at the first time period. Based on the reception, the server 102 may further determine the current geo-location of the first vehicle 106 or the first electronic device 108. For example, the current geo-location may include a longitude, a latitude, and/or an altitude of the current location of the first vehicle 106 or the first electronic device 108.

In an embodiment, the server 102 may communicate with one or more closed-circuit television (CCTV) cameras installed on various check points on different roads. The server 102 may determine the first location information 308 associated with the first geo-location of the first vehicle 106 at the first time period, based on a license plate number of the first vehicle 106. The license plate number of the first vehicle 106 may be captured by the one or more closed-circuit television (CCTV) cameras. The server 102 may determine the first location information 308 of the first vehicle 106 based on the recognition of the license plate number of the first vehicle 106 and known location of a CCTV camera which captured the corresponding image of the license plate of the first vehicle 106.

At 302D, a first advertisement content transmission operation may be executed. In an embodiment, for the first advertisement content transmission operation, the circuitry 202 may be configured to determine first advertisement content (for example the first advertisement content 114 in FIG. 1) to be rendered on the first infotainment device 104 of the first vehicle 106. The first advertisement content may advertise one or more of, but not limited to, a first product, a first brand, or a first service. In an embodiment, the circuitry 202 may determine the first advertisement content based on the content metadata (i.e. determined at 302B). In an example, the circuitry 202 may determine a particular genre (i.e. metadata) of the media content (say as Jazz) and determine the first advertisement content of the same genre. For example, the first advertisement content may be related to (but not limited to) new content, upcoming musical event, offers or an artist linked with the same genre (for example Jazz). In another example, circuitry 202 may determine an artist (i.e. metadata) of the media content and determine the first advertisement content related to the same artist. In such case, the first advertisement content may be related to a product, content, an event, or a service related to the artist of the media content rendered on the first infotainment device 104.

In an embodiment, the circuitry 202 may further determine the first advertisement content based on the determined emotional state of the first person 112 in the first vehicle 106. In another embodiment, the determination of the first advertisement content may be based on the determined emotional state of the first person 112 and/or the determined first demographic information 306 associated with the first person 112. In another embodiment, the determination of the first advertisement content may be based on at least one of the determined content metadata, the determined emotional state, the determined first demographic information 306, and the determined first location information 308. For example, the first person 112 may be regularly listening to audio media content (i.e. a song) sung by a particular singer 'ABC' while going from his home to the office. In such scenario, the first advertisement content may be associated with a new song sung by the singer 'ABC' on a first music platform. In another example, based on the first location information 308, the first advertisement content may advertise a concert of the singer 'ABC' at a location which may be nearby to the geo-location of the first infotainment device 104 or the first electronic device 108 indicated in the first location information 308. The determined first advertisement content may be further transmitted to the first infotainment device 104 of the first vehicle 106. The first infotainment device 104 may further receive the first advertisement content and render the first advertisement content via at least one of the display interface or the audio interface of the first infotainment device 104 of the first vehicle 106.

At 302E, a second information reception operation may be executed. In an embodiment, for the second information reception operation, the circuitry 202 may be configured to receive second information 310. The second information 310 may be received from the first infotainment device 104 of the first vehicle 106 or from the first electronic device 108 of the first person 112. The received second information 310 may be indicative of an absence of the first person 112 from the first vehicle 106 at a second time period. In an embodiment, the second time period (for example in HH:MM format) may be a time instance after the first time period. In an embodiment, the second information 310 may indicate an exit of the first person 112 from the first vehicle 106. In an embodiment, the first infotainment device 104 may control internal image capture devices (not shown) to capture images of an interior of the first vehicle 106 to generate the second information 310 indicating the exit or absence of the first person 112 from the first vehicle 106 at the second time period. In another embodiment, the first advertisement content 114 or the first electronic device 108 may receive user inputs from the first person 112 to indicate an exit (or absence) of the first person 112 from the first vehicle 106 and to generate the second information 310. In such case, for example, the user inputs may indicate an end of a trip of the first person 112 using the first vehicle 106. In another embodiment, the first infotainment device 104 may transmit the second information 310 to the server 102 when the first vehicle 106 may be within a threshold distance (for example certain meters) from a destination location of the trip using the first vehicle 106. In another embodiment, the first electronic device 108 may transmit the second information 310 to the server 102 when the geo-location of the first electronic device 108 is within the threshold distance (for example certain meters) from the destination location. For example, the second information 310 may be received by the server 102, when the first person 112 may have reached a parking space of an office (i.e., a destination) of the first person 112 or may be within the threshold distance (say, 100 meters) from the parking space of the office.

At 302F, a usage statistics determination operation may be executed. In an embodiment, for the usage statistics determination operation, the circuitry 202 may be configured to determine usage statistics 312 of a set of applications associated with the first electronic device 108. The set of applications may be installed or configured on the first electronic device 108 of the first person 112. In an embodiment, the circuitry 202 may transmit a usage statistics request to the first electronic device 108 based on the reception of the second information 310. Based on the reception of the usage statistics request, the first electronic device 108 may transmit the usage statistics 312 to the server 102. The usage statistics 312 may include usage information of each of the set of applications associated with or installed on the first electronic device 108. The usage information of each of the set of applications may indicate, but is not limited to, a time at which a particular application is accessed in a day, a duration for which the application is used, or a type of activities (i.e. automobile-related, content sharing, content rendering, social networking, shopping, emails, ticket booking, travel-related, financial-related, health-related, games, educational, or related to the first vehicle 106) performed by the corresponding application.

In an embodiment, based on the usage statistics 312 of the set of applications, the circuitry 202 may determine one or more first applications of the set of applications that may be most frequently used by the first person 112 just after driving/travelling. In other words, the one or more first applications may be most frequently used by the first person 112 within a time threshold (for example, in few minutes) from the second time period.

At 302G, a first application determination operation may be executed. In an embodiment, for the first application determination operation, the circuitry may be configured to determine a first application from the set of applications based on the determined usage statistics 312. The determined usage statistics 312 may indicate that a usage of the first application may be maximum among the set of applications within the time threshold from the second time period. In other words, the first application with maximum usage may be the most frequently or most often used by the first person 112 after driving or travelling from the first vehicle 106. For example, the first person 112 mostly uses an application 'A' while the first person 112 walks towards his office cabin from the parking space (after driving or travelling) or mostly uses the application 'A' in next 2 mins (i.e. time threshold) after the second time period of exit from the first vehicle 106. In another embodiment, the application 'A' may have a maximum usage in a day among the set of applications or with the time threshold after the exit of the first person 112 from the first vehicle 106. In such cases, the application 'A' may be determined as the first application.

At 302H, a capability information determination operation may be executed. In an embodiment, for the capability information determination operation, the circuitry 202 may be configured to determine capability information 314 about the first electronic device 108. For example, the capability information 314 may indicate hardware capability and/or software capability associated with the first electronic device 108. Examples of the hardware capability may include, but are not limited to, an image or video content rendering capability, an audio content rendering capability, a closed caption capability, a size of a display screen, a resolution of the display screen, a processor speed, a size of storage device, a hardware architecture, a type of input device, a network capability, a type of in-built sensor, a battery capacity, or a power of audio device. Further, examples of the software capability may include, but are not limited to, a type and a version of operating system (OS), a programing language, security settings, a version of web browser, a communication protocol, or a current application version.

Based on the determined capability information 314 of the first electronic device 108, the circuitry 202 may be modify or update the first advertisement content. In an embodiment, the modification of the first advertisement content may correspond to at least one of: a change in a format of the first advertisement content (say, from an audio advertisement to a visual advertisement or vice-versa), a change in a file type of the first advertisement content, a change in a resolution of the first advertisement content, a change in a shape of graphics/text in the first advertisement content, a change in content of the first advertisement content, a change in a version of the first advertisement content, a change in size of the first advertisement content, and the like. The circuitry 202 may update or modify the first advertisement content based on a change in hardware or software (i.e. operating system) capabilities between the first infotainment device 104 and the first electronic device 108 to render the first advertisement content (i.e. determined at 302D).

In an embodiment, the first electronic device 108 may be capable to render the first advertisement content on the determined first application. In such a scenario, the modification of the first advertisement content may not be required. Herein, the second advertisement content rendered on the first electronic device 108 may be same as the first advertisement content. However, the first advertisement content may be modified in cases where the capability information 314 indicates that the first electronic device 108 and/or the first application has a different hardware and/or software capability than that is required to render the first advertisement content (i.e. rendered on the first infotainment device 104 during driving/travelling in the first vehicle 106).

At 302I, a second advertisement content generation operation may be executed. In an embodiment, for the second advertisement content generation, the circuitry 202 may be configured to generate the second advertisement content to be rendered on the determined first application associated with or installed on the first electronic device 108. The second advertisement content may be generated based on the modification of the first advertisement content. As an example, the first advertisement content 114 may be an audio advertisement about at least one of the first product, the first brand, or the first service related to the content metadata or the media content. In an embodiment, the circuitry 202 may determine the first advertisement content based on the hardware/software capability of the first infotainment device 104 to render the first advertisement content. For example, in case, the first infotainment device 104 only include audio interface (not with display interface) as the hardware capability, then the first advertisement content may in an audio form. In case, the first electronic device 108 includes a display screen (i.e. as a hardware capability) that may be used by the first application to render content, then the second advertisement content may be a visual advertisement about the first product, the first brand, or the first service. Thus, based on the change in the hardware/software capability, the circuitry 202 of the server 102 may be configured to generate visual content (i.e. as the second advertisement content) corresponding to the audio advertisement (i.e. the first advertisement content). To generate the visual content, the circuitry 202 may look-up the visual content corresponding to the audio content from a pre-stored content look-up table stored in the memory 204. In an embodiment, such content look-up table may be provided by an advertisement agency or an organization that may market, manufacture, and/or sell the product or service.

At 302J, a second advertisement content transmission operation may be executed. In an embodiment, for the second advertisement content transmission operation, the circuitry 202 may be configured to transmit the generated second advertisement content to the first electronic device 108. The generated second advertisement content may be rendered on the determined first application installed or configured on the first electronic device 108. In an embodiment, the second advertisement content may be same as or related to the first advertisement content. For example, the second advertisement content may be about the same first product, the first brand, or the first service which is also advertised by the first advertisement content to the first person 112 while travelling in the first vehicle 106. The second advertisement may be further displayed or rendered on the application 'A' associated with or installed on the first electronic device 108 within the threshold time after the second time period.

In another embodiment, the second advertisement content may advertise about a second product, a second brand, or a second service. The second product, the second brand, or the second service may be similar to the first product, the first brand, or the first service. For example, in case the first advertisement content advertises about a song by a singer A on a first music platform, the second advertisement content may advertise another or a new song by the same singer 'A' or a singer of a related genre or album on a second music platform. Thus, the first advertisement content rendered on the first infotainment device 104 (i.e. one platform) and the second advertisement content rendered on the first electronic device 108 (i.e. another platform) may relate to different products/brands/services, but may relate to same content metadata of the media content rendered to the first person 112 while travelling in the first vehicle 106.

As another example, if the first advertisement content advertises a first mobile phone of a first brand, then the second advertisement content may advertise a second mobile phone of a second brand that may have almost similar specifications or features (i.e. metadata) as that of the first mobile phone. Therefore, the disclosed server 102 may be capable to re-target the first advertisement content (or similar second advertisement content) on a mobile platform (i.e. the first electronic device 108) of the first person 112, to remind (or refresh a memory of) the first person 112 after driving/traveling about the first advertisement content rendered in the first vehicle 106 via the first infotainment device 104 during driving/traveling. The first advertisement content (or the similar second advertisement content) may be rendered on the determined first application (i.e. most often used application after driving/traveling) of the first electronic device 108 in real-time. This may further increases an access rate (like a click rate) of the first advertisement content or the second advertisement content, to enhance a sales or revenue related to a product/brand/service advertised by the first advertisement content (or the second advertisement content). Further, since the context of the first advertisement content (i.e. rendered to the first person 112 during driving/traveling) and the second advertisement content (i.e. rendered to the first person 112 on most often used application within the threshold time after driving/traveling) may be same or similar, the first person 112 may be able to easily relate to the advertisement content presented to him/her after driving/traveling the first vehicle 106. Further, based on the rendering of similar advertisement (or contextually similar advertisement) just after driving (i.e. via another platform, i.e. most frequently used application within the time threshold after driving), the disclosed server 102 may provide similar content or advertisement rendering experience to the first person 112 at both times (i.e. during and after driving/traveling). Thus, based on the rendering of the advertisement content just after driving (i.e. related to the media content), may facilitate the first person 112 to retain the media content that he/she has experienced while travelling/driving the first vehicle 106. Such dynamic retention of the media content by the advertisement content (i.e. determined by the disclosed server 102) may enhance sales, revenue, or brand of the products/services advertised by the determined advertisement content.

Figure 4:
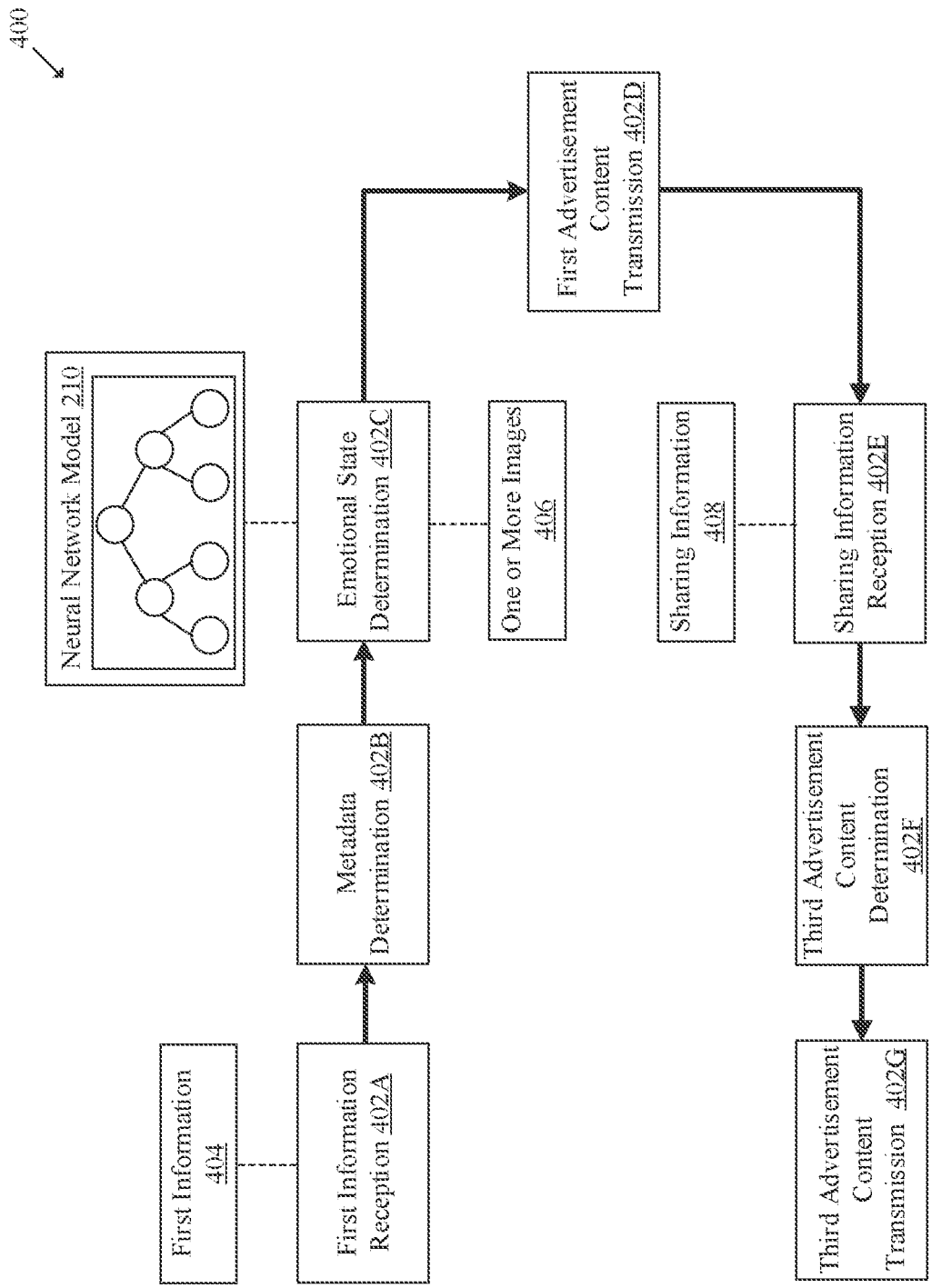
FIG. 4 is a diagram that illustrates exemplary operations for targeting of advertisements to multiple persons based on sharing of media content, in accordance with an embodiment of the disclosure.

FIG. 4 is a diagram that illustrates exemplary operations for targeting of advertisements to multiple persons based on sharing of media content, in accordance with an embodiment of the disclosure. FIG. 4 is explained in conjunction with elements from FIG. 1, FIG. 2, and FIG. 3. With reference to FIG. 4, there is shown a block diagram 400 of exemplary operations from 402A to 402G performed by the server 102 or the circuitry 202.

At 402A, a first information reception operation may be executed. In an embodiment, for the first information reception operation, the circuitry 202 may be configured to receive first information 404 (similar to the first information 304 in FIG. 3). The first information 404 may indicate a presence of the first person 112 in the first vehicle 106 at a first time period and may be received from the first infotainment device 104 of the first vehicle 106 or from the first electronic device 108 of the first person 112. Details about the reception of the first information 404 are provided, for example, in FIG. 3 (at 302A).

At 402B, a metadata determination operation may be executed. In an embodiment, for the metadata determination operation, the circuitry 202 may be configured to determine content metadata associated with media content that may be rendered via the first infotainment device 104 of the first vehicle 106. The circuitry 202 may be configured to determine the content metadata associated with the media content based on the reception of the first information 404. The media content may correspond to audio media content or video media content. Specifically, the media content may be rendered via the display interface or the audio interface of the first infotainment device 104 of the first vehicle 106. Details about the content metadata and related determination are provided, for example, in FIG. 3 (at 302B).

At 402C, an emotional state determination operation may be executed. In an embodiment, for the emotional state determination operation, the circuitry 202 may be configured to determine an emotional state of the first person 112 in the first vehicle 106. In an embodiment, the circuitry 202 may determine the emotional state of the first person 112 based on the genre of the media content. In another embodiment, the circuitry 202 may determine emotional state of the first person 112 based on an application of the NN model 210 on one or more images 406 of the first person 112 captured by one or more the image capture devices. Details about the determination of the emotional state of the first person 112 based on the genre of the media content and/or based on the one or more images 406 are provided, for example, in FIG. 3 (at 302C).

At 402D, a first advertisement content transmission operation may be executed. In an embodiment, for the first advertisement content transmission operation, the circuitry 202 may be configured to determine first advertisement content (such as the first advertisement content 114 in FIG. 1) to be rendered on the first infotainment device 104 of the first vehicle 106. The first advertisement content may advertise one or more of: a first product, a first brand, or a first service related to the media content. In an embodiment, the circuitry 202 may determine the first advertisement content based on the determined content metadata. In another embodiment, the circuitry 202 may determine the first advertisement content based on the determined emotional state of the first person 112 travelling in or driving the first vehicle 106. In another embodiment, the first advertisement content may be determined based on at least one of the determined content metadata of the media content, determined emotional state of the first person 112, the first demographic information associated with the first person 112, and/or the determined location information of the first vehicle 106 and/or the first electronic device 108 as described, for example, in FIG. 3 (at 302D). The determined first advertisement content may be further transmitted to the first infotainment device 104 of the first vehicle 106. The first infotainment device 104 may receive the first advertisement content and render the first advertisement content via at least one of the display interface or the audio interface of the first infotainment device 104 of the first vehicle 106.

At 402E, a sharing information reception operation may be executed. In an embodiment, for the sharing information reception operation, the circuitry 202 of the server 102 may be configured to receive sharing information 408 from the first infotainment device 104 of the first vehicle 106 or from the first electronic device 108. The sharing information 408 may indicate a reception of a first input from the first person 112 to share the media content to a second infotainment device of a second vehicle or to a second electronic device. The second vehicle and the second electronic device may be associated with a second person (different from the first person 112). In an embodiment, the second person may be the owner or user of the second vehicle and the second electronic device.

In an embodiment, the first person 112 may provide the first input to the first infotainment device 104 (or to the first electronic device 108) to further share the media content to the second infotainment device or to the second electronic device because the first person 112 may assume or may be aware that the second person may like or may be interested in the media content as well. As an example, the first person 112 and the second person may be friends (or family members or colleagues) and may frequently listen to songs of a singer 'ABC', and the media content may be a song sung by the singer 'ABC'. The first input may be thus received by the first infotainment device 104 (or by the first electronic device 108) from the first person 112, to share a same/new/another song (i.e. media content) of singer 'ABC' with the second person. For example, the first person 112 may share the media content with the second person using a content sharing application configured on the first infotainment device 104 or on the first electronic device 108. Examples of the content sharing application may include, but are not limited to, an email application, a social networking application, a ride sharing application, an instant messaging application, or a file sharing application.

At 402F, a third advertisement content determination operation may be executed. In an embodiment, for the third advertisement content determination operation, the circuitry 202 may be configured to determine third advertisement content. The circuitry 202 may determine the third advertisement content based on the reception of the sharing information 408. The third advertisement content may be associated with the first advertisement content rendered in the first vehicle 106 or associated with the second advertisement content rendered on the first electronic device 108 (via the first application as most often used after driving/travelling using the first vehicle 106). In an embodiment, the third advertisement content may advertise one or more of a third brand (similar to the first brand or the second brand), a third service (similar to the first service or the second service), or a third product (similar to the first product or the second product). In an embodiment, the third advertisement may be same as the first advertisement content or the second advertisement content. The determination of the third advertisement content may be based on content metadata associated with the media content shared with the second person, via the second infotainment device or the second electronic device. The determination of advertisement content (for example, the first advertisement content) based on the content metadata associated with the media content is described further, for example, in FIG. 3 (at 302B and 302D).

At 402G, a third advertisement content transmission operation may be executed. In an embodiment, for the third advertisement content transmission operation, the circuitry 202 may be configured to transmit the determined third advertisement content on the second infotainment device of the second vehicle or to the second electronic device of the second person. In an embodiment, the third advertisement content may be transmitted to the second infotainment device of the second vehicle or to the second electronic device based on the received sharing information 408 indicating the sharing of the media content from the first person 112 to the second person. The second infotainment device may receive the determined third advertisement content and may render the determined third advertisement via an audio interface and/or a display interface of the second infotainment device. Alternatively, or in addition, the second electronic device may receive the determined third advertisement content and may render the determined third advertisement content via an audio interface and/or a display interface of the second electronic device.

In an embodiment, the circuitry 202 may be configured to determine second demographic information associated with the second person. The circuitry 202 may be further configured to determine second location information associated with a second geo-location of the second vehicle or the second electronic device at a third time period. The second geo-location may be a current geo-location of the second vehicle or the second electronic device. The third time period may be a time instant at which the shared media content may be rendered by the second infotainment device of the second vehicle or by the second electronic device of the second person. The circuitry 202 may be further configured to transmit fourth advertisement content to the second infotainment device of the second vehicle or to the second electronic device based on the determined second demographic information related to the second person and/or the determined second location information of the second vehicle or the second electronic device. By way of example, and not limitation, the first advertisement content may advertise a concert of a singer 'ABC' at a location which may be near to a location 'X' of the first vehicle 106, and the second geo-location of the second infotainment device (or the second electronic device) may be a location 'Y', which may be far away (for example in different city) from the location 'X'. In such case, for example, the fourth advertisement content may advertise a concert of another singer of a genre of music similar to that of the singer 'ABC', at a location which may be near to the location 'Y' (i.e. second geo-location).

In some embodiments, the circuitry 202 may generate the fourth advertisement content based on the modification of the first advertisement content or the third advertisement content. The modification may be performed based on the second demographic information associated with the second person considering that the second demographic information may be different from the first demographic information 306 of the first person 112. For example, if a gender (i.e. first demographic information 306) of the first person 112 is male and a gender (i.e. second demographic information) of the second person is different (such as female), then the circuitry 202 of the server 102 may modify or customize the first advertisement content to the fourth advertisement content for the second person, such that the fourth advertisement content may be more relevant for the second person (i.e. to whom same media content is shared from the first person 112) with different demographics or current geo-location. In some embodiments, the circuitry 202 may retrieve (or search) different advertisement content (i.e. as the fourth advertisement content) based on the second demographic information of the second person, rather than modifying the first advertisement content. In such case, the other advertisement content may be retrieved (or searched) based on the content metadata of the shared media content. For example, if the first person 112 is an adult and the second person is a child, then the circuitry 202 may retrieve the other advertisement content (i.e. as the fourth advertisement content) which may be more relevant to an age of the child, rather than modifying the first advertisement content rendered to the first person 112. Herein, both the first advertisement content and the fourth advertisement content may be determined based on the content metadata of the media content shared between the first person 112 and the second person.

In some embodiments, the circuitry 202 may further receive third information from the second infotainment device of the second vehicle or from the second electronic device of the second person. The third information may indicate an absence of the second person from the second vehicle at a fourth time period. Based on the reception of the third information, the circuitry 202 may determine usage statistics of a set of applications (hereinafter referred as a second set of applications) associated with (or installed on) the second electronic device. Based on the determination of the usage statistics of the second set of applications on the second electronic device, the circuitry 202 may determine an application (hereinafter referred as a second application) from the second set of applications. The usage statistics may indicate that the second application may have a maximum usage among the second set of applications within the time threshold from the fourth time period. In other words, the second application on the second electronic device may be most frequently or often used by the second person after driving/travelling using the second vehicle. The details related to the determination of most frequently used application based on the usage statistics after driving are provided, for example, in FIG. 3 (at 302F and 302G).

The circuitry 202 may further determine capability information about the second electronic device and modify third advertisement content (or the fourth advertisement content) to generate a fifth advertisement content based on the capability information about the second electronic device. The fifth advertisement content may be associated with the third advertisement content or the fourth advertisement content. In an embodiment, the fifth advertisement content may be same as the third advertisement content or the fourth advertisement content. Details about the capability information and the modification of advertisement content based on the capability information are provided, for example, in FIG. 3 (at 302H and 302I).

The circuitry 202 of the server 102 may further configured to transmit the fifth advertisement content to the second electronic device. The fifth advertisement content may be transmitted to be rendered on the determined second application on the second electronic device. Thus, the disclosed server 102 may be capable to target advertisements to a chain of users based on the sharing of the media content between electronic devices or the infotainment devices of the users. Certain advertisement content may be determined as associated with the media content that may be presented to the first person 112 on the first infotainment device of the first vehicle 106. The disclosed server 102 may present such advertisement content to the first infotainment device of the first vehicle 106 and/or the first electronic device 108. As the advertisement content may be related to the media content, the advertisement content may be of interest for the first person 112. Now, in certain cases, the same media content may be shared by the first person 112 to the second infotainment device of the second vehicle and/or the second electronic device of the second person. The media content may be shared as the first person 112 may assume or may be aware that the second person may have similar interests as the first person and he/she may also like to consume the same media content. Thereafter, based on the sharing of the media content to other people, the disclosed server 102 may generate another advertisement content (or even use the same advertisement content) related to the media content and present such advertisement on the second infotainment device and/or the second electronic device of the second person with whom the first person 112 shared the media content. Thus, the newly generated (or also the same) and presented advertisement content may be also of interest to the second person and to other people in a chain to whom the same media content may be further shared. Therefore, based on a similar media content interest of the second person, targeted or relevant advertisements may be presented to the second person (or to other people), much like the first person 112. Such kind of targeting the similar advertisements (or substantially similar advertisement corresponding to demographic information of an individual) based on the sharing of the media content, the disclosed server 102 may further enhance the brand (or revenue) of advertised products, content, or services.

It may be noted that in FIG. 4, the sharing of the media content is limited to the second person only. However, the media content may be shared to multiple persons and the third advertisement content, or the fourth advertisement content, may be rendered on the respective infotainment devices or electronic devices of each of these multiple persons. The details about the sharing of the media content, and rendering of the third advertisement content, or the fourth advertisement content to the multiple chain of persons have been omitted for the sake of brevity.

Figure 5:
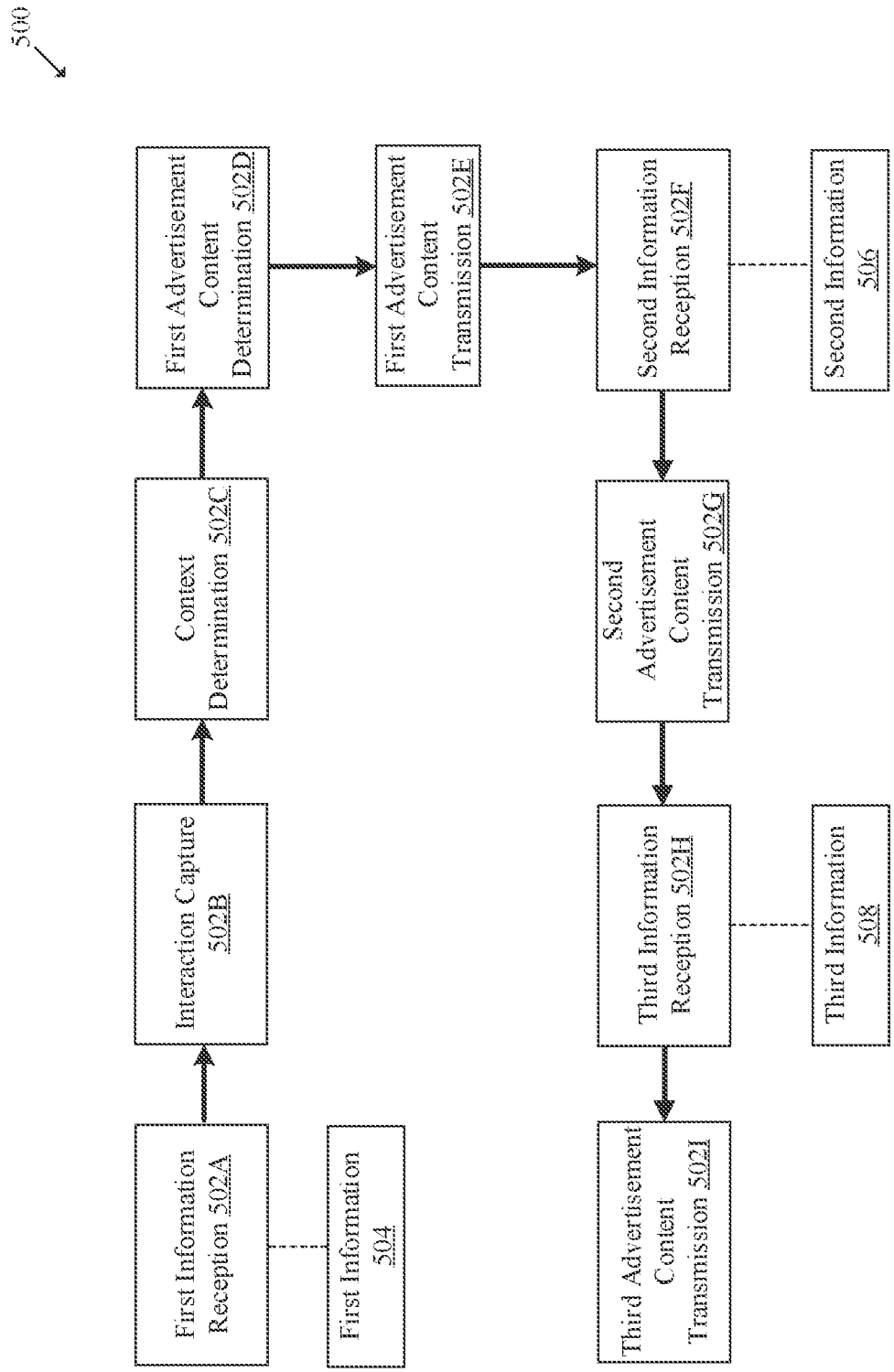
FIG. 5 is a diagram that illustrates exemplary operations for targeting of advertisements to multiple persons based on an interaction between multiple persons, in accordance with an embodiment of the disclosure.

FIG. 5 is a diagram that illustrates exemplary operations for targeting of advertisements to multiple persons based on an interaction between multiple persons, in accordance with an embodiment of the disclosure. FIG. 5 is explained in conjunction with elements from FIG. 1, FIG. 2, FIG. 3, and FIG. 4. With reference to FIG. 5, there is shown a block diagram 500 of exemplary operations from 502A to 502I performed by the server 102 or the circuitry 202.

At 502A, a first information reception operation may be executed. In an embodiment, for the first information reception operation, the circuitry 202 may be configured to receive first information 504 (i.e. similar to the first information 304 in FIG. 3). The first information 504 may indicate a presence of the first person 112 in the first vehicle 106 at a first time period. The first information 504 may be received from the first infotainment device 104 of the first vehicle 106 or from the first electronic device 108 of the first person 112. In an embodiment, the first infotainment device 104 of the first vehicle 106 may transmit the first information 504 to the server 102 as soon as the engine of the first vehicle 106 may be started. In some other embodiments, the first electronic device 108 may be configured to transmit the first information 504 to the server 102 based on reception of a user input to start the first vehicle 106 or to start a ride towards a particular destination. In such scenario, the transmitted first information 504 may indicate that the first person 112 may be present in the first vehicle 106 at the first time period (for example at 2:00 PM).

In an embodiment, the first person 112 may be interacting or communicating with a second person while travelling in the first vehicle 106. In an embodiment, the first person 112 may be travelling with the second person in the same first vehicle 106 at the first time period. In another embodiment, at the first time period, the second person may be travelling in the second vehicle that may be different from the first vehicle 106. In such scenario, the first person 112 may be interacting with the second person via the first infotainment device 104 of the first vehicle 106 or via the first electronic device 108 (for example through an audio-based call, a video-based call, or a chat/messaging based communication).

At 502B, an interaction data capture operation may be executed. In an embodiment, for the interaction data capture operation, the circuitry 202 may be configured to capture or receive interaction data based on an interaction or communication between the first person 112 and the second person while travelling in respective or same vehicles. In an embodiment, one or more audio capture devices may be integrated within the first vehicle 106 and/or the second vehicle. Each of the one or more audio capture devices may include suitable logic, circuitry, and/or interfaces that may be configured to capture audio signals of the verbal interaction or communication between the first person 112 and the second person. Each of the audio capture devices may be further configured to convert the captured audio signals into electrical signals and further transmit the electrical signals to the server 102 or to the first infotainment device 104 or to the first electronic device 108 for further transmission to the server 102. In an embodiment, the electrical signals may correspond to the interaction data. For example, the interaction data may include an audio recording of a verbal conversation between the first person 112 and the second person. Examples of each of the audio capture devices may include, but are not limited to, a recorder, an electret microphone, a dynamic microphone, a carbon microphone, a piezoelectric microphone, a fiber microphone, a (micro-electro-mechanical-systems) MEMS microphone, or other microphones known in the art. In some embodiments, one or more image capture devices may be integrated within the first vehicle 106 and/or the second vehicle. Each of the one or more image capture devices may include suitable logic, circuitry, and/or interfaces that may be configured to capture one or more images (or video) of the first person 112 and the second person interacting with the first person 112. Each of the image capture devices may be further configured to transmit the captured images (or videos) to the server 102 or to the first infotainment device 104 or to the first electronic device 108 for further transmission to the server 102. In an embodiment, the captured images/videos may correspond to the interaction data between the first person 112 and the second person. In yet another embodiment, the interaction data may correspond to chat messages communicated between the first person 112 and the second vehicle while travelling in respective vehicles. In such case, the server 102 may receive the communication chat messages from the first infotainment device 104 (or the first electronic device 108) related to the first person 112 and the second infotainment device (or the second electronic device) related to the second person.

At 502C, a context determination operation may be executed. In an embodiment, for the context determination operation, the circuitry 202 may be configured to determine a context of the interaction or communication between the first person 112 and the second person based on the captured interaction data (in form of audio, images/video, and/or chat messages). In an embodiment, the circuitry 202 may be configured to use one or more natural language processing (NLP) techniques to determine the context of the interaction between the first person 112 and the second person. In an embodiment, the NLP techniques may utilize a combination of computational linguistics rules for modeling of human language based on statistical, machine learning, and deep learning models to determine the context of the interaction. In another embodiment, the one or more NLP techniques may include multiple sub-tasks to determine the context of the interaction. In an embodiment, the deep learning model used in the one or more NLP techniques may use Recurrent Neural Network (RNN) or gated recurrent unit (GRU)-based RNN. The detailed implementation of the aforementioned NLP techniques for determination of the context may be known to one skilled in the art, and therefore, a detailed description for the aforementioned NLP techniques has been omitted from the disclosure for the sake of brevity. The determined context of the interaction may indicate common interests, preferences, or upcoming events related to the first person 112 and the second person. For example, the context may indicate (but is not limited to) that both the first person 112 and the second person are males and may have common interest in football sports, or both may be planning to go on a holiday to a particular tourist place or both like a particular movie actor, and so on.

At 502D, a first advertisement content determination operation may be executed. In an embodiment, for the first advertisement content determination operation, the circuitry 202 may be configured to determine first advertisement content to be rendered on the first infotainment device 104 of the first vehicle 106 and/or to the second infotainment device of the second vehicle. The circuitry 202 may determine the first advertisement content based on the determined context of the interaction between the first person 112 and the second person. The first advertisement content may advertise one of a first brand, a first product, or a first service related to the determined context. By way of an example, and not limitation, if the context of the interaction between the first person 112 and the second person is about a new car of brand CA', then the first advertisement content may advertise the same new car, another similar car of brand CA', or a car of another brand in the same market segment as the brand 'A'. In another example, but not limited to, if the context of the interaction indicates that both the first person 112 and the second person are planning to go on the holiday to the particular tourist place, then the circuitry 202 of the server 102 may determine the first advertisement content related to flights, trains, cab services, hotels, shopping center, events, or discount offers associated with the planned tourist place.

At 502E, a first advertisement content transmission operation may be executed. In an embodiment, for the first advertisement content transmission operation, the circuitry 202 may be configured to transmit the determined first advertisement content to the first infotainment device 104 of the first vehicle 106 and/or the second infotainment device of the second vehicle. The first infotainment device 104 and/or the second infotainment device of the second vehicle may receive the first advertisement content and render the first advertisement content via at least one of the display interface or the audio interface of the first infotainment device 104 of the first vehicle 106 and/or the second infotainment device of the second vehicle.

At 502F, a second information reception operation may be executed. In an embodiment, for the second information reception operation, the circuitry 202 may be configured to receive second information 506 (similar to the second information 310 in FIG. 3). The second information 506 may be received from the first infotainment device 104 of the first vehicle 106 or from the first electronic device 108 of the first person 112. The received second information may be indicative of an absence of the first person 112 from the first vehicle 106 at a second time period as described in FIG. 3 (at 302E).

At 502G, a second advertisement content transmission operation may be executed. In an embodiment, for the second advertisement content transmission operation, the circuitry 202 may be configured to transmit the second advertisement content to the first electronic device 108. The circuitry 202 may determine a first application used by the first person 112 on the first electronic device 108 within a time threshold from the second time period. The determination of the first application is described further, for example, in FIG. 3 (at 302F and 302G). The second advertisement content may be rendered on the determined first application of a set of application installed on the first electronic device 108 associated with the first person 112. In an embodiment, the second advertisement content may be associated with the first advertisement content. For example, the second advertisement content may advertise about one or more of a second product (similar to the first product advertised by the first advertisement content), a second brand (similar to the first brand advertised by the first advertisement content), or a second service (similar to the first service advertised by the first advertisement content). In another embodiment, the second advertisement content may be same as the first advertisement content At 502H, third information reception operation may be executed. In an embodiment, for the third information reception operation, the circuitry 202 may receive third information 508 ((similar to the second information 310 in FIG. 3). The third information 508 may be received from the second infotainment device of the second vehicle or from the second electronic device associated with the second person. The received second information may be indicative of an absence or exit of the second person from the second vehicle at a third time period as described with respect to the first person 112 in FIG. 3 (at 302E).

At 502I, a third advertisement content transmission operation may be executed. In an embodiment, for the third advertisement content transmission operation, the circuitry 202 may transmit third advertisement content to the second electronic device related to the second person with whom the first person 112 interacted. The circuitry 202 may be further configured to determine an application (hereinafter referred as a second application) mostly used by the second person on the second electronic device within the time threshold from the third time period (or after driving/travelling in the second vehicle). The determination of the second application is similar to the determination of the first application which is described, for example, in FIG. 3 (at 302G). The third advertisement content may be rendered on the second application installed on or associated with the second electronic device associated with the second person. For example, the third advertisement content may advertise about one or more of a third product (similar to the first product or the second product), a third brand (similar to the first brand or the second brand), or a third service (similar to the first service or the second service). In an embodiment, the third advertisement content may be same as the second advertisement content transmitted to the first electronic device 108. In an embodiment, the third advertisement content may be same as the first advertisement content transmitted to the first infotainment device 104 of the first vehicle 106 and/or the second infotainment device of the second vehicle.

Thus, the disclosed server 102 may be transmit real-time targeted advertisements to electronic devices (such as mobile phones) of multiple persons based on the context of the interaction or communication among the multiple persons (either travelling in same or different vehicles). Certain advertisement content may be determined as associated with the interaction between the first person 112 and the second person. Such advertisement content may be presented to the first person 112 on the first infotainment device of the first vehicle 106 and/or the first electronic device 108 by the disclosed server 102. As the advertisement content may be related to the context of the interaction, the advertisement content may be of interest for the first person 112. Thereafter, the disclosed server 102 may generate/search another advertisement content (or even use the same advertisement content) related to the context of the interaction (and/or based on demographics of the second person) and present such advertisement on the second electronic device of the second person. Thus, the newly generated/searched (or also the same) advertisement content that may be presented to the second person may be also of interest to the second person. Therefore, based on the context of the interaction, the disclosed server 102 may provide targeted (and relevant) advertisements to the people who may be a part of the interaction on multiple platforms during and after driving/travelling respective vehicles.

It may be noted here that the entire description is explained with respect to a vehicle platform and an electronic device (or mobile device) platform. However, the disclosure may not be limited to the vehicle platform and the electronic device (or mobile device) platform only. The present disclosure may be also applicable to other platforms such as the vehicle platform and a television (TV) platform, or the vehicle platform and a smart speaker platform, without deviation from the scope of the disclosure.

Figure 6:
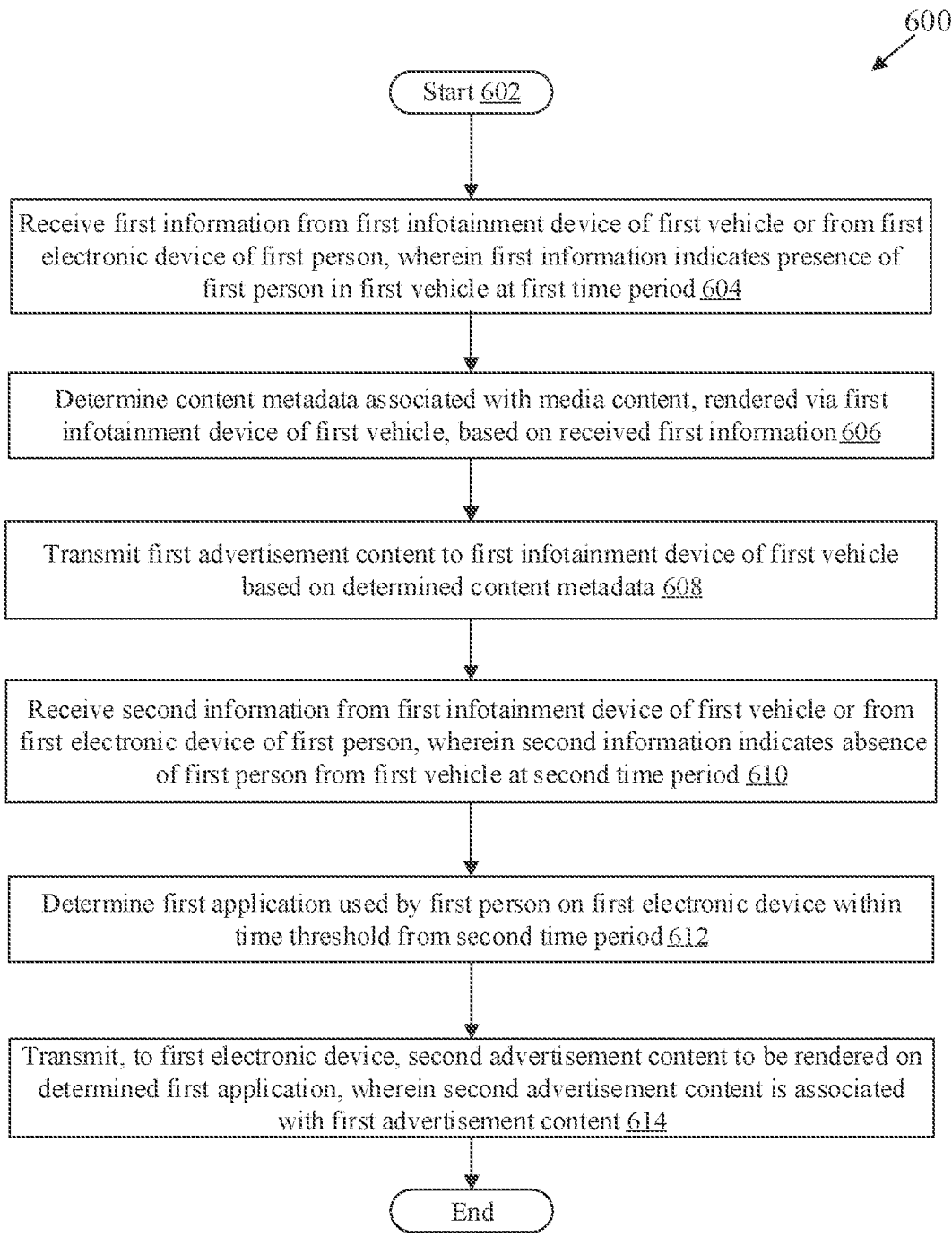
FIG. 6 is a flowchart that illustrates exemplary operations for real-time targeting of advertisements across multiple platforms, in accordance with an embodiment of the disclosure.

FIG. 6 is a flowchart that illustrates exemplary operations for real-time targeting of advertisements across multiple platforms, in accordance with an embodiment of the disclosure. With reference to FIG. 6, there is shown a flowchart 600. The flowchart 600 is described in conjunction with FIGS. 1, 2, 3, 4, and 5. The operations from 602 to 614 may be implemented, for example, by the server 102 of FIG. 2 or the circuitry 202 of FIG. 2. The operations of the flowchart 600 may start at 602 and proceed to 604.

At 604, the first information 304 may be received from the first infotainment device 104 of the first vehicle 106 or from the first electronic device 108 of the first person 112. The first information 304 may indicate a presence of the first person 112 in the first vehicle 106 at the first time period. In accordance with an embodiment, the server 102 or the circuitry 202 may be configured to receive first information 304 from the first infotainment device 104 of the first vehicle 106 or from the first electronic device 108 of the first person 112. Details about the reception of the first information 304 are provided, for example, in FIG. 3 (at 302A).

At 606, the content metadata associated with the media content may be determined. The media content may be rendered via the first infotainment device 104 of the first vehicle 106. The content metadata may be determined based on the received first information 304. In accordance with an embodiment, the server 102 or the circuitry 202 may be configured to determine the content metadata associated with the media content, rendered via the first infotainment device 104 of the first vehicle 106, based on the received first information 304. Details about the determination of the content metadata are provided, for example, in FIG. 3 (at 302B).

At 608, the first advertisement content 114 may be transmitted to the first infotainment device 104 of the first vehicle 106 based on the determined content metadata. In accordance with an embodiment, the server 102 or the circuitry 202 may be configured to transmit the first advertisement content 114 to the first infotainment device 104 of the first vehicle 106 based on the determined content metadata, as described, for example, in FIG. 3 (at 302C and 302D), FIG. 4, and FIG. 5.

At 610, the second information 310 may be received from the first infotainment device 104 of the first vehicle 106 or from the first electronic device 108 of the first person 112. The second information 310 may indicate an absence or exit of the first person 112 from the first vehicle 106 at the second time period. In accordance with an embodiment, the server 102 or the circuitry 202 may be configured to receive the second information 310 from the first infotainment device 104 of the first vehicle 106 or from the first electronic device 108 of the first person 112. Details about the reception of the second information 310 are provided, for example, in FIG. 3 (at 302E), and FIG. 5.

At 612, the first application used by the first person 112 on the first electronic device 108 within a time threshold from the second time period may be determined. In accordance with an embodiment, the server 102 or the circuitry 202 may be configured to determine the first application used by the first person 112 on the first electronic device 108 within the time threshold from the second time period. In an embodiment, the first application may be frequently used or most often used on the first electronic device 108 by the first person 112 after driving/travelling the first vehicle 106. Details about the determination of the first application are provided, for example, in FIG. 3 (at 302F and 302G).

At 614, the second advertisement content 116 may be transmitted, to the first electronic device 108, to be rendered on the determined first application. The second advertisement content 116 may be associated with the first advertisement content 114. In accordance with an embodiment, the server 102 or the circuitry 202 may be configured to transmit, to the first electronic device 108, the second advertisement content 116 to be rendered on the determined first application. Details about the determination and the transmission of the second advertisement content 116 are provided, for example, in and FIG. 3 (at 302H, 302I, and 302J).

Although the flowchart 600 is illustrated as discrete operations, such as 604, 606, 608, 610, 612, and 614 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the server 102) for real-time targeting of advertisements across multiple platforms. The set of instructions may be executable by the machine and/or the computer to perform operations that may include reception of the first information (such as the first information 304) from the first infotainment device (such as the first infotainment device 104) of the first vehicle (such as the first person 112) or from the first electronic device (such as the first electronic device 108) of the first person (such as the first person 112). The operations may further include determination of the content metadata, associated with the media content, based on the received first information. The media content may be rendered via the first infotainment device of the first vehicle. The operations may further include transmission of first advertisement content (such as the first advertisement content 114) to the first infotainment device of the first vehicle based on the determined content metadata. The operations may further include reception of second information (such as the second information 310) from the first infotainment device of the first vehicle or from the first electronic device of the first person. The second information may indicate an absence of the first person from the first vehicle at a second time period. The operations may further include determination of a first application used by the first person on the first electronic device within the time threshold from the second time period. The operations may further include transmission of second advertisement content (such as the second advertisement content 116), to be rendered on the determined first application, to the first electronic device. The second advertisement may be associated with the first advertisement content.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A server, comprising:
   circuitry which:
   receives first information from a first infotainment device of a first vehicle or from a first electronic device of a first person, wherein the first information indicates a presence of the first person in the first vehicle at a first time period;
   determines content metadata associated with media content, rendered via the first infotainment device of the first vehicle, based on the received first information;
   transmits first advertisement content to the first infotainment device of the first vehicle based on the determined content metadata;
   receives second information from the first infotainment device of the first vehicle or from the first electronic device of the first person, wherein the second information indicates an absence of the first person from the first vehicle at a second time period;
   determines a first application used by the first person on the first electronic device within a time threshold from the second time period; and
   transmits, to the first electronic device, second advertisement content to be rendered on the determined first application, wherein the second advertisement content is associated with the first advertisement content.

2. The server according to claim 1, wherein the circuitry further:
   determines usage statistics of a set of applications associated with the first electronic device; and
   determines the first application from the set of applications based on the determined usage statistics, wherein a usage of the first application is maximum among the set of applications within the time threshold from the second time period.

3. The server according to claim 1, wherein the second advertisement content is same as the first advertisement content.

4. The server according to claim 1, wherein the circuitry further:
   determines capability information about the first electronic device;
   modifies the first advertisement content based on the determined capability information;
   generate the second advertisement content based on the modification; and
   transmits, to the first electronic device, the generated second advertisement content to be rendered on the determined first application.

5. The server according to claim 1, wherein the circuitry further:
   determines first demographic information associated with the first person;
   determines first location information associated with a first geo-location of the first vehicle or the first electronic device at the first time period; and
   determines the first advertisement content for transmission to the first infotainment device of the first vehicle based on the determined first demographic information and the determined first location information.

6. The server according to claim 1, wherein the circuitry further:
   determines an emotional state of the first person in the first vehicle based on a genre of the media content; and
   determines the first advertisement content for transmission to the first infotainment device of the first vehicle based on the determined emotional state of the first person.

7. The server according to claim 1, wherein the circuitry further:
   controls one or more image capture devices within the first vehicle to capture one or more images of the first person in the first vehicle;
   determines an emotional state of the first person based on the captured one or more images; and
   determines the first advertisement content for transmission to the first infotainment device of the first vehicle based on the determined emotional state of the first person.

8. The server according to claim 1, wherein the first infotainment device renders the first advertisement content via at least one of a display interface or an audio interface of the first infotainment device of the first vehicle.

9. The server according to claim 1, wherein the circuitry further:
receive sharing information from the first infotainment device of the first vehicle or from the first electronic device, wherein the sharing information indicates a first input from the first person to share the media content to a second infotainment device of a second vehicle or to a second electronic device, and wherein the second vehicle and the second electronic device are associated with a second person; and
transmits third advertisement content on the second infotainment device of the second vehicle or to the second electronic device based on the received sharing information,
wherein the third advertisement content is associated with the first advertisement content rendered in the first vehicle or associated with the second advertisement content rendered on the first electronic device.

10. The server according to claim 9, wherein the third advertisement content is same as the first advertisement content.

11. The server according to claim 9, wherein the circuitry further:
determines second demographic information associated with the second person;
determines second location information associated with a second geo-location of the second vehicle or the second electronic device at a third time period, wherein the shared media content is rendered by the second infotainment device or by the second electronic device at the third time period; and
transmits fourth advertisement content on the second infotainment device of the second vehicle or to the second electronic device based on the determined second demographic information and the determined second location information.

12. The server according to claim 1, wherein the circuitry further:
captures interaction data based on an interaction between the first person and a second person;
determines a context of the interaction based on the captured interaction data; and
determines the first advertisement content for transmission to the first infotainment device of the first vehicle based on the determined context of the interaction.

13. The server according to claim 12, wherein the second person is present at the first time period in a second vehicle different from the first vehicle.

14. A method, comprising:
in a server:
receiving first information from a first infotainment device of a first vehicle or from a first electronic device of a first person, wherein the first information indicates a presence of the first person in the first vehicle at a first time period;
determining content metadata associated with media content, rendered via the first infotainment device of the first vehicle, based on the received first information;
transmitting first advertisement content to the first infotainment device of the first vehicle based on the determined content metadata;
receiving second information from the first infotainment device of the first vehicle or from the first electronic device of the first person, wherein the second information indicates an absence of the first person from the first vehicle at a second time period;
determining a first application used by the first person on the first electronic device within a time threshold from the second time period; and
transmitting, to the first electronic device, second advertisement content to be rendered on the determined first application, wherein the second advertisement is associated with the first advertisement content.

15. The method according to claim 14, further comprising:
determining usage statistics of a set of applications associated with the first electronic device; and
determining the first application from the set of applications based on the determined usage statistics, wherein a usage of the first application is maximum among the set of applications within the time threshold from the second time period.

16. The method according to claim 14, wherein the second advertisement content is same as the first advertisement content.

17. The method according to claim 14, further comprising:
receiving sharing information from the first infotainment device of the first vehicle or from the first electronic device, wherein the sharing information indicates a first input from the first person to share the media content to a second infotainment device of a second vehicle or to a second electronic device, and wherein the second vehicle and the second electronic device are associated with a second person; and
transmitting third advertisement content on the second infotainment device of the second vehicle or to the second electronic device based on the received sharing information, wherein the third advertisement content is associated with the first advertisement content rendered in the first vehicle or associated with the second advertisement content rendered on the first electronic device.

18. The method according to claim 17, wherein the third advertisement content is same as the first advertisement content.

19. The method according to claim 14, further comprising:
capturing interaction data based on an interaction between the first person and a second person;
determining a context of the interaction based on the captured interaction data; and
determining the first advertisement content for transmission to the first infotainment device of the first vehicle based on the determined context of the interaction.

20. A non-transitory computer-readable storage medium configured to store instructions that, in response to being executed, causes a server to perform operations, the operations comprising:
receiving first information from a first infotainment device of a first vehicle or from a first electronic device of a first person, wherein the first information indicates a presence of the first person in the first vehicle at a first time period;
determining content metadata associated with media content, rendered via the first infotainment device of the first vehicle, based on the received first information;
transmitting first advertisement content to the first infotainment device of the first vehicle based on the determined content metadata;
receiving second information from the first infotainment device of the first vehicle or from the first electronic device of the first person, wherein the second information indicates an absence of the first person from the first vehicle at a second time period;
determining a first application used by the first person on the first electronic device within a time threshold from the second time period; and
transmitting, to the first electronic device, second advertisement content to be rendered on the determined first application, wherein the second advertisement is associated with the first advertisement content.

* * * * *